(12) United States Patent
Kim et al.

(10) Patent No.: US 11,518,915 B2
(45) Date of Patent: Dec. 6, 2022

(54) ADHESIVE COMPOSITION, PROTECTIVE FILM AND POLARIZING PLATE WHICH COMPRISE ADHESIVE LAYER COMPRISING SAME, AND IMAGE DISPLAY DEVICE COMPRISING SAME

(71) Applicant: SHANJIN OPTOELECTRONICS (SUZHOU) CO., LTD., Zhangjiagang (CN)

(72) Inventors: Yoobin Kim, Daejeon (KR); Hae Sung Cho, Daejeon (KR); Hyun Hee Son, Daejeon (KR); Changhwa Ahn, Daejeon (KR); Jin Ah Seok, Daejeon (KR); Jun Gu Yeo, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 218 days.

(21) Appl. No.: 16/612,239

(22) PCT Filed: Jun. 18, 2018

(86) PCT No.: PCT/KR2018/006831
§ 371 (c)(1),
(2) Date: Nov. 8, 2019

(87) PCT Pub. No.: WO2019/004641
PCT Pub. Date: Jan. 3, 2019

(65) Prior Publication Data
US 2020/0209639 A1  Jul. 2, 2020

(30) Foreign Application Priority Data
Jun. 27, 2017  (KR) .................. 10-2017-0081395

(51) Int. Cl.
*C09J 129/04* (2006.01)
*C09J 7/20* (2018.01)
(Continued)

(52) U.S. Cl.
CPC .............. *C09J 129/04* (2013.01); *C09J 7/20* (2018.01); *C09J 11/06* (2013.01); *G02B 5/30* (2013.01);
(Continued)

(58) Field of Classification Search
CPC ...... C09J 129/04; C08K 5/34922; C08K 5/42; G02B 27/28; G02B 5/30; G02F 1/133528; C09K 2323/031; C09K 2323/057
See application file for complete search history.

(56) References Cited

U.S. PATENT DOCUMENTS 6,054,519 A    4/2000  Jakob et al.
6,841,605 B1   1/2005  Kumakura et al.
(Continued)

FOREIGN PATENT DOCUMENTS

CN    1139633 C     2/2004
CN    101253431 A   8/2008
(Continued)

OTHER PUBLICATIONS

International Search Report for Application No. PCT/KR2018/006831, dated Oct. 2, 2018, pp. 1-3.
(Continued)

*Primary Examiner* — Sophie Hon
(74) *Attorney, Agent, or Firm* — Schmeiser, Olsen & Watts, LLP

(57) ABSTRACT

An adhesive composition is provided. The adhesive composition includes a polyvinyl alcohol-based resin; a melamine-based crosslinking agent; an acid catalyst; and a
(Continued)

silane-based additive. The weight ratio of the melamine-based crosslinking agent and the acid catalyst is from 5:1 to 1:1. The acid catalyst also has a sulfonic acid group. A protective film and a polarizing plate including an adhesive layer including the adhesive composition, and an image display device including the polarizing plate is also provided.

13 Claims, 2 Drawing Sheets

(51) Int. Cl.
 *C09J 11/06* (2006.01)
 *G02B 5/30* (2006.01)
 *G02B 27/28* (2006.01)
 *G02F 1/1335* (2006.01)

(52) U.S. Cl.
 CPC ....... *G02B 27/28* (2013.01); *G02F 1/133528* (2013.01); *C09K 2323/031* (2020.08); *C09K 2323/053* (2020.08)

(56) References Cited

U.S. PATENT DOCUMENTS

| | | | |
|---|---|---|---|
| 2005/0147837 | A1 | 7/2005 | Tsujiuchi et al. |
| 2007/0148483 | A1* | 6/2007 | Tomoguchi ................ C09J 9/00 428/500 |
| 2008/0273153 | A1* | 11/2008 | Takeda .............. G02F 1/133634 349/118 |
| 2017/0101561 | A1* | 4/2017 | Choi ...................... C09J 133/08 |

FOREIGN PATENT DOCUMENTS

| | | | | |
|---|---|---|---|---|
| CN | 106471084 | A | 3/2017 | |
| KR | 20050072696 | A | 7/2005 | |
| KR | 20060103451 | A | 9/2006 | |
| KR | 20090037079 | A | 4/2009 | |
| KR | 20090049382 | A | 5/2009 | |
| KR | 20100090602 | A | 8/2010 | |
| KR | 20150039825 | A | 4/2015 | |
| KR | 20150136915 | A | 12/2015 | |
| KR | 20160143648 | A | 12/2016 | |
| KR | 102186080 | B1 * | 12/2020 | .......... C08K 5/0025 |
| TW | 506999 | B | 10/2002 | |
| WO | 2016059926 | A1 | 4/2016 | |

OTHER PUBLICATIONS

Taiwan Office Action for Application No. 107121736, dated Dec. 21, 2018, pp. 1-6.
Written Opinion for Application No. PCT/KR208/006831, dated Oct. 2, 2018, pp. 1-6.
Extended European Search Report for Application No. EP18824559.1 dated Jun. 26, 2020, 3 pgs.
Database CA[Online] Chemical Abstracts Service, Columbus, Ohio, US; Kyrosawa, Shao et al: "Adhesive composition for polarizing plates, adhesive sheet, polarizing plate with adhesive layer and laminate", retrieved from STN Database accession No. 2016:628515, abstract, 3 pgs.

* cited by examiner

ADHESIVE COMPOSITION, PROTECTIVE FILM AND POLARIZING PLATE WHICH COMPRISE ADHESIVE LAYER COMPRISING SAME, AND IMAGE DISPLAY DEVICE COMPRISING SAME

CROSS-REFERENCE TO RELATED APPLICATIONS

The present application is a National Stage Entry under 35 U.S.C. § 371 of International Application No. PCT/KR2018/006831 filed Jun. 18, 2018 which claims priority from Korean Patent Application No. 10-2017-0081395, filed Jun. 27, 2017, all of which are incorporated herein by reference.

TECHNICAL FIELD

The present specification relates to an adhesive composition, a protective film and a polarizing plate including an adhesive layer including the same, and an image display device including the same.

BACKGROUND ART

A polarizing plate used in various image display devices such as a liquid crystal display device, a plasma display device and an organic light emitting diode has a structure with a polarizer formed with a polyvinyl alcohol-based film and a protective film formed on at least one surface of the polarizer. Meanwhile, as an adhesive for a polarizing plate used for adhering the polarizer and the protective film, polyvinyl alcohol-based adhesives are normally used.

However, a polyvinyl alcohol-based resin adhesive is a water-soluble polymer, and thereby has a problem of the polarizer and the protective film being peeled off by the adhesive being dissolved under a high humidity condition.

In order to resolve such a problem, methods of modifying a polyvinyl alcohol-based resin by adding an acetoacetyl group thereto, copolymerizing a hydrophobic vinyl monomer such as ethyl acrylate, methyl acrylate, acrylic acid or methacrylic acid, or mixing a polyvinyl alcohol-based resin with a crosslinking agent such as a glyoxalate salt or an amine metal salt have been proposed.

Polyvinyl alcohol-based adhesives prepared using methods as above tend to exhibit somewhat enhanced water resistance compared to cases using polyvinyl alcohol alone, however, there are still problems in that water resistance and adhesive strength are not sufficient when used in high speed production lines. In addition, modified polyvinyl alcohol-based resin adhesives have had a problem of producing stains under an alkaline pH condition, and the methods of mixing with a crosslinking agent also have had a problem of declining optical properties of a polarizing plate depending on the amount of the crosslinking agent.

Accordingly, adhesives for adhering a polarizer and a protective film having excellent adhesive strength and water resistance for the polarizer and the protective film while maintaining optical properties of the polarizing plate have been required.

DISCLOSURE

Technical Problem

The present specification is directed to providing an adhesive composition, a protective film and a polarizing plate including an adhesive layer including the same, and an image display device including the same.

Technical Solution

One embodiment of the present specification provides an adhesive composition including a polyvinyl alcohol-based resin; a melamine-based crosslinking agent; an acid catalyst; and a silane-based additive, wherein a weight ratio of the melamine-based crosslinking agent and the acid catalyst is from 5:1 to 1:1, and the acid catalyst includes a sulfonic acid group.

One embodiment of the present specification provides a protective film including an adhesive layer including the adhesive composition described above provided on one surface of the protective film.

One embodiment of the present specification provides a polarizing plate including a polarizer; an adhesive layer provided on at least one surface of the polarizer, and including the adhesive composition described above; and a protective film provided on at least one surface of the adhesive layer.

In addition, one embodiment of the present specification provides an image display device including a display panel; and the polarizing plate described above provided on one surface or both surfaces of the display panel.

Advantageous Effects

An adhesive composition according to one embodiment of the present specification includes a polyvinyl alcohol-based resin; a melamine-based crosslinking agent; an acid catalyst; and a silane-based additive, wherein a weight ratio of the melamine-based crosslinking agent and the acid catalyst is from 5:1 to 1:1, and the acid catalyst includes a sulfonic acid group, and the adhesive composition exhibits excellent water resistance.

MODE FOR DISCLOSURE

Figure 1:
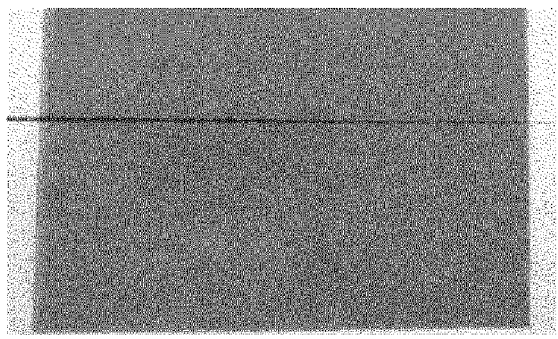
FIG. 1 is a photograph after evaluating water resistance of a polarizing plate according to Example 1.

Hereinafter, the present specification will be described in detail.

In the present specification, a description of a certain part "including" certain constituents means capable of further including other constituents, and does not exclude other constituents unless particularly stated on the contrary.

In the present specification, a description of a certain member being placed "on" another member includes not only a case of the one member adjoining the another member but a case of still another member being present between the two members.

One embodiment of the present specification provides an adhesive composition including a polyvinyl alcohol-based resin; a melamine-based crosslinking agent; an acid catalyst;

and a silane-based additive, wherein a weight ratio of the melamine-based crosslinking agent and the acid catalyst is from 5:1 to 1:1, and the acid catalyst includes a sulfonic acid group.

According to one embodiment of the present specification, the melamine-based crosslinking agent is represented by the following Chemical Formula 1.

[Chemical Formula 1]

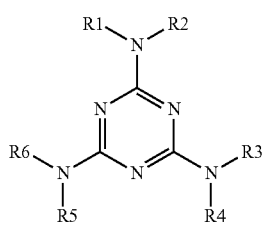

In Chemical Formula 1, R1 to R6 are the same as or different from each other, and each independently hydrogen, deuterium, a substituted or unsubstituted alkyl group, a substituted or unsubstituted alkoxy group, a substituted or unsubstituted imine group, a substituted or unsubstituted amine group, a substituted or unsubstituted heteroaryl group, or a substituted or unsubstituted aryl group.

According to one embodiment of the present specification, R1 to R6 are the same as or different from each other, and each independently hydrogen, a methyl group, an ethyl group, a propyl group, a methoxy group, an ethoxy group, ethylenediamine, pyrrolidine, piperidine or an amino group.

According to one embodiment of the present specification, R1 to R6 are a substituted or unsubstituted alkyl group.

According to one embodiment of the present specification, R1 to R6 are an alkyl group substituted with an alkoxy group.

According to one embodiment of the present specification, R1 to R6 are a methyl group substituted with a methoxy group.

According to one embodiment of the present specification, at least one of R1 to R6 is hydrogen.

According to one embodiment of the present specification, at least one of R1 to R6 is a substituted or unsubstituted imine group, or a substituted or unsubstituted amine group.

According to one embodiment of the present specification, the melamine crosslinking agent includes at least one or more imine groups or amine groups. When one of R1 to R6 is hydrogen, the melamine crosslinking agent may be considered to include an imine group, and when R1 and R2 are hydrogen, the melamine crosslinking agent may be considered to include an amine group. When at least one of R1 to R6 is an imine group or an amine group, an alkyl group substituted with an imine group or an amine group, or aryl substituted with an imine group or an amine group, the melamine crosslinking agent may also be considered to include an imine group or an amine group.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the term "substituted or unsubstituted" in the present specification means being substituted with one, two or more substituents selected from the group consisting of deuterium; a halogen group; a substituted or unsubstituted alkyl group; a substituted or unsubstituted alkoxy group; a substituted or unsubstituted imine group; a substituted or unsubstituted amine group; a substituted or unsubstituted aryl group; and a substituted or unsubstituted heterocyclic group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopenthylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the amine group may be selected from the group consisting of —NH$_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group and a diheteroarylamine group, and although not particularly limited thereto, the number of carbon atoms is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group; an N-phenylnaphthylamine group; an N-biphenylnaphthylamine group; an N-naphthylfluorenylamine group; an N-phenylphenanthrenylamine group; an N-biphenylphenanthrenylamine group; an N-phenylfluorenylamine group; an N-phenylterphenylamine group; an N-phenanthrenylfluorenylamine group; an N-biphenylfluorenylamine group and the like, but are not limited thereto.

In the present specification, the aryl group is not particularly limited, but preferably has 6 to 30 carbon atoms, and the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent groups may bond to each other to form a ring.

When the fluorenyl group is substituted,

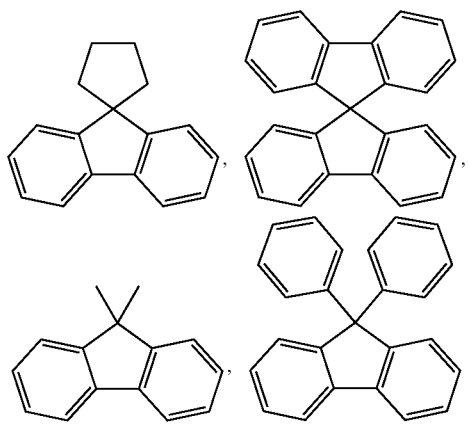

and the like may be included. However, the structure is not limited thereto.

According to one embodiment of the present specification, the acid catalyst further includes one or more selected from the group consisting of nitric acid, hydrochloric acid, sulfuric acid, phosphoric acid, lactic acid, acetic acid and formic acid.

According to one embodiment of the present specification, the acid catalyst is preferably paratoluenesulfonic acid, and when using paratoluenesulfonic acid compared to when using other acid catalysts or not using an acid catalyst, an increase in the curing temperature of the crosslinking agent may be prevented, stability after mixing with the adhesive is excellent, and the process is readily performed since the acid catalyst is present in a liquid form instead of a gel form at room temperature.

According to one embodiment of the present specification, the silane-based additive is a silane alkoxide-based compound.

According to one embodiment of the present specification, the silane alkoxide-based compound includes an amine group or an epoxy group. Including an amine group or an epoxy group is effective in enhancing water resistance by reacting with an imine group or an amine group in the melamine crosslinking agent and thereby increasing a crosslinking reaction.

According to one embodiment of the present specification, the melamine-based crosslinking agent is included in 5 parts by weight to 100 parts by weight, the acid catalyst in 1 part by weight to 20 parts by weight, and the silane-based additive in 10 parts by weight to 100 parts by weight with respect to 100 parts by weight of the polyvinyl alcohol-based resin.

According to one embodiment of the present specification, the melamine-based crosslinking agent is included in 5 parts by weight to 100 parts by weight, the acid catalyst in 1 part by weight to 20 parts by weight, the silane-based additive in 10 parts by weight to 100 parts by weight, and water in 1000 parts by weight to 10000 parts by weight with respect to 100 parts by weight of the polyvinyl alcohol-based resin.

The melamine crosslinking agent is preferably included in approximately 5 parts by weight to 100 parts by weight with respect to 100 parts by weight of the polyvinyl alcohol-based resin, and when the melamine crosslinking agent is included 5 parts by weight or greater, sufficient crosslinkage occurs enhancing water resistance, and when included in 100 parts by weight or less, stability increases by increasing storage properties since gelation does not occur in a short period of time after mixing with the adhesive composition.

The acid catalyst is preferably included in approximately 1 part by weight to 20 parts by weight with respect to 100 parts by weight of the polyvinyl alcohol-based resin.

The silane-based additive is preferably included in approximately 10 parts by weight to 100 parts by weight with respect to 100 parts by weight of the polyvinyl alcohol-based resin. When the silane-based additive is included in 10 parts by weight or greater, adhesive strength is enhanced under water resistance and moisture resistance environments, and when included in 100 parts by weight or less, wrinkle occurrences are prevented during a drying process when manufacturing a polarizing plate.

According to one embodiment of the present specification, the adhesive composition has a pH of 2 to 6, which may readily prevent a problem of stain occurrences compared to alkaline pH conditions.

According to one embodiment of the present specification, the adhesive composition has viscosity of 5 cp to 40 cp.

According to one embodiment of the present specification, additives such as a gluing agent, an ultraviolet absorber, an antioxidant, a stabilizer or a coupling agent may be added to the adhesive composition. An adhesive having target performance may be obtained by adding the corresponding additives.

One embodiment of the present specification provides a protective film including a protective film; and an adhesive layer including the adhesive composition described above provided on one surface of the protective film.

According to one embodiment of the present specification, the protective film is a triacetylcellulose film, a cycloolefin polymer (COP) film or an acryl-based film.

One embodiment of the present specification provides a polarizing plate including a polarizer; an adhesive layer provided on at least one surface of the polarizer and including the adhesive composition described above; and a protective film provided on at least one surface of the adhesive layer.

The polarizer is not particularly limited, and polarizers well known in the art such as films formed with polyvinyl alcohol (PVA) including iodine or a dichroic dye may be used. The polarizer may be prepared by dyeing a PVA film with iodine or a dichroic dye, however, the preparation method thereof is not limited thereto. In the present specification, the polarizer means a state not including a protective film, and the polarizing plate means a state including a polarizer and a protective film.

Next, the adhesive layer includes the adhesive composition according to the embodiments of the present specification described above, and may be formed using methods well known in the art. For example, a method of forming an adhesive layer by coating the adhesive composition on one surface of a polarizer or a protective film, laminating the polarizer and the protective film, and then curing the result may be used. Herein, the coating may be conducted using coating methods well known in the art such as spin coating, bar coating, roll coating, gravure coating or blade coating.

Meanwhile, the adhesive layer may have a thickness of approximately greater than 0 μm and less than or equal to 20 μm, approximately greater than 0 μm and less than or equal to 10 μm, preferably approximately 0.1 μm to 10 μm, or 0.1 μm to 5 μm. When the adhesive layer thickness is too small, uniformity and adhesive strength of the adhesive layer may decline, and the adhesive layer thickness being too large may cause a problem of producing wrinkles on the appearance of the polarizing plate.

The protective film is for supporting and protecting a polarizer, and protective films made of various materials generally known in the art such as cellulose-based films, polyethylene terephthalate (PET) films, cycloolefin polymer (COP) films or acryl-based films may be used without limit. Among these, acryl-based films are particularly preferably used considering optical properties, durability, economic feasibility and the like.

Meanwhile, in order to further enhance adhesive strength, the polarizing plate of the present specification may further include a primer layer between the adhesive layer and the protective film. Herein, the primer layer may be formed using a method of coating a coating solution including a water-dispersible polymer resin, water-dispersible fine particles and water on the protective film using a bar coating method, a gravure coating method or the like, and drying the result. Examples of the water-dispersible polymer resin may include water-dispersible polyurethane-based resins, water-dispersible acryl-based resins, water-dispersible polyester-based resins or combinations thereof. As the water-dispersible fine particles, inorganic fine particles such as silica, titania, alumina or zirconia, organic fine particles formed with silicone-based resins, fluorine-based resins, (meth) acryl-based resins, crosslinked polyvinyl alcohol and melamine-based resins, or combinations thereof may be used, however, the water-dispersible polymer resin and the water-dispersible fine particles are not limited thereto.

One embodiment of the present specification provides an image display device including a display panel; and the polarizing plate according to the embodiments described above provided on one surface or both surfaces of the display panel.

The display panel may be a liquid crystal panel, a plasma panel and an organic light emitting panel.

Accordingly, the image display device may be a liquid crystal display device (LCD), a plasma display panel device (PDP) and an organic light emitting diode (OLED).

More specifically, the image display device may be a liquid crystal display device including a liquid crystal panel and polarizing plates each provided on both surfaces of this liquid crystal panel, and herein, at least one of the polarizing plates may be a polarizing plate including the polarizer according to one embodiment of the present specification described above. In other words, the polarizing plate locally has, in a polarizing plate including an iodine and/or dichroic dye-dyed polyvinyl alcohol-based polarizer and a protective film provided on at least one surface of the polyvinyl alcohol-based polarizer, a depolarized area with single body transmittance of 80% or greater in a wavelength band of 400 nm to 800 nm, and the depolarized area has arithmetic mean roughness (Ra) of 200 nm or less, a polarization degree of 10% or less and sagging of 10 μm or less.

Herein, types of the liquid crystal panel included in the liquid crystal display device are not particularly limited. For example, known panels including passive matrix type panels such as a twisted nematic (TN) type, a super twisted nematic (STN) type, a ferroelectic (F) type or a polymer dispersed (PD) type; active matrix type panels such as a two terminal type or a three terminal type; in plane switching (IPS) type panels, vertical alignment (VA) type panels, and the like, may all be used without being limited in the type. In addition, other constitutions forming the liquid crystal display device, for example, types of upper and lower substrates (for example, a color filter substrate or an array substrate) and the like, are not particularly limited as well, and constitutions known in the art may be employed without limit.

Hereinafter, the present specification will be described in more detail with reference to examples. However, the following examples are for illustrative purposes only, and not to limit the scope of the present disclosure.

Example 1

(a) Preparation of Polarizing Film (Polarizer)

A polyvinyl alcohol film having a thickness of 40 μm was dyed by being immersed into a dyeing solution of iodine and potassium iodide while moving the polyvinyl alcohol film using a guide roll, and then elongated by approximately 3 times to 5 times. Subsequently, the film was introduced to a bath of boric acid and potassium iodide to be crosslinked, and then dried for approximately 5 minutes to 8 minutes at 80° C. to obtain a polarizing film.

(b) Preparation of Adhesive

Polyvinyl alcohol (Nippon Synthetic Chemical Industry Co., Ltd. Z-200) (average degree of polymerization 2000, degree of saponification 94%) containing an acetoacetyl group was dissolved in pure water to prepare a 3.8% aqueous polyvinyl alcohol solution.

10% by weight of an aqueous melamine solution was prepared by dissolving a melamine crosslinking agent (Cytec Solvay Group, cymel 327) in pure water. The aqueous melamine solution was added in 20 parts by weight (based on melamine solid content) with respect to 100 parts by weight of the polyvinyl alcohol in the aqueous polyvinyl alcohol solution prepared above, and the result was mixed while stirring. 10 parts by weight of paratoluenesulfonic acid (purchased from Sigma Aldrich) and 40 parts by weight of a silane-based additive (Chisso Corporation, S510) were added to the mixture solution with respect to 100 parts by weight of the polyvinyl alcohol to prepare an additive.

(c) Preparation of Polarizing Plate

Using the adhesive prepared above, a saponified triacetylcellulose (TAC) film having a thickness of 40 μm was adhered on both surfaces of the polyvinyl alcohol-based polarizing film as a protective film, and the result was laminated and then dried to prepare a polarizing plate.

Example 2

A polarizing plate was prepared in the same manner as in Example 1 except that 4 parts by weight of the paratoluenesulfonic acid was used with respect to 100 parts by weight of the polyvinyl alcohol in the adhesive composition of Example 1.

Comparative Example 1

A polarizing plate was prepared in the same manner as in Example 1 except that 10 parts by weight of 1 M acetic acid (purchased from Sigma Aldrich) was used instead of the paratoluenesulfonic acid in the adhesive composition of Example 1.

Comparative Example 2

A polarizing plate was prepared in the same manner as in Example 1 except that the silane-based additive was not added in the adhesive composition of Example 1.

Comparative Example 3

A polarizing plate was prepared in the same manner as in Example 1 except that the paratoluenesulfonic acid was added in 2 parts by weight with respect to 100 parts by weight of the polyvinyl alcohol in the adhesive composition of Example 1.

Comparative Example 4

A polarizing plate was prepared in the same manner as in Example 1 except that the paratoluenesulfonic acid was not added in the adhesive composition of Example 1.

Comparative Example 5

A polarizing plate was prepared in the same manner as in Example 1 except that the paratoluenesulfonic acid and the silane-based additive were not added in the adhesive composition of Example 1.

Comparative Example 6

A polarizing plate was prepared in the same manner as in Example 1 except that the melamine crosslinking agent, the paratoluenesulfonic acid and the silane-based additive were not added in the adhesive composition of Example 1.

<Storage Stability and Water Resistance Evaluations>

1) Storage Stability-Available Time (Pot Life) Evaluation

The adhesive was prepared and then stirred for 10 minutes, 50 mL of the adhesive was introduced to a 100 mL vial, and time taken for the adhesive to become a gel was measured. As for the identification of the gelation, the state of the adhesive no longer moving when shaking the vial containing the adhesive was visually identified. It is preferred as the adhesive has a longer available time (pot life), and a minimum of 12 hours or longer, and more preferably 3 days or longer is required to be used in a process.

2) Water Resistance Evaluation

After each of the polarizing plates obtained in Examples 1 and 2, and Comparative Examples 1 to 6 was cut into a size of 50 mm$^2$*80 mm$^2$, one surface of the triacetylcellulose (TAC) film of the polarizing plate was coated with an acrylate-based gluing agent, and then the result was laminated on glass. The degree of peel-off and PVA solubility were measured when leaving the polarizing plate laminated on the glass unattended for 72 hours in a water-resistant thermostat (25° C./100% RH). It is preferred as the degree of peel off and solubility decreases.

Figure 2:
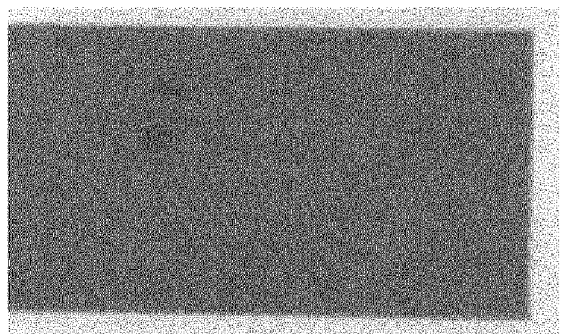
FIG. 2 is a photograph after evaluating water resistance of a polarizing plate according to Example 2.
Figure 3:
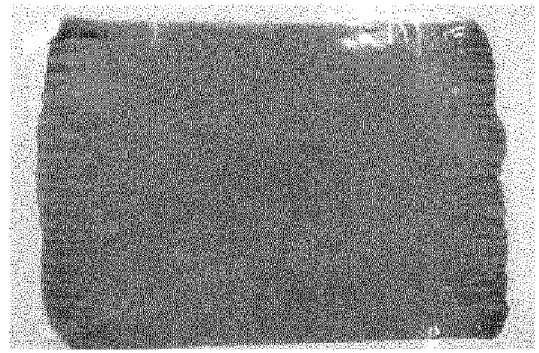
FIG. 3 is a photograph after evaluating water resistance of a polarizing plate according to Comparative Example 2.
Figure 4:
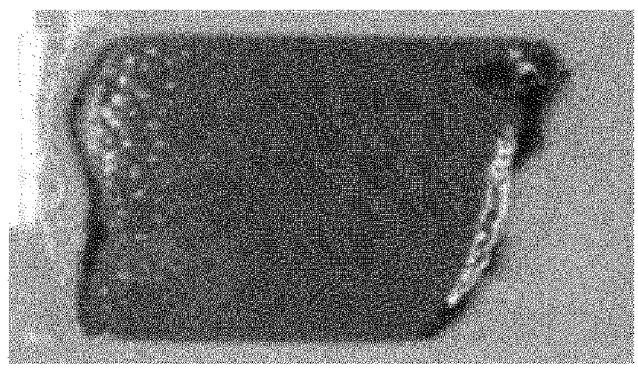
FIG. 4 is a photograph after evaluating water resistance of a polarizing plate according to Comparative Example 3.
Figure 5:
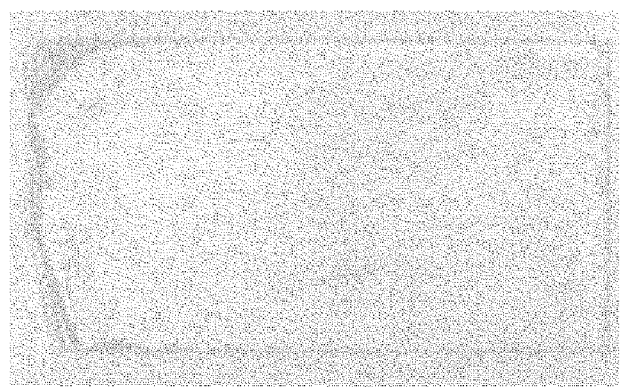
FIG. 5 is a photograph after evaluating water resistance of a polarizing plate according to Comparative Example 4.

In addition, photographs of the polarizing plates of Examples 1 and 2, and Comparative Examples 2 to 4 after the water resistance evaluation are shown in FIGS. 1 to 5.

TABLE 1

| Category | Adhesive Composition | Storage Stability (Pot Life) | Water Resistance Evaluation (Room Temperature 72 hrs) | |
| --- | --- | --- | --- | --- |
| | | | Curing at 140° C. or Higher | Curing at 100° C. or Higher |
| Example 1 | PVA 100 parts by weight/melamine 20 parts by weight p-tsa 10 parts by weight/silane-based additive 40 parts by weight | 5 Days or Longer | OK | OK |
| Example 2 | PVA 100 parts by weight/melamine 20 parts by weight p-tsa 4 parts by weight/silane-based additive 40 parts by weight | 5 Days | OK | OK |
| Comparative Example 1 | PVA 100 parts by weight/melamine 20 parts by weight acetic acid 10 parts by weight/silane-based additive 40 parts by weight | 3 Days | OK | 60% Dissolved |
| Comparative Example 2 | PVA 100 parts by weight/melamine 20 parts by weight p-tsa 10 parts by weight | 5 Days or Longer | 10% Dissolved | 30% Dissolved |
| Comparative Example 3 | PVA 100 parts by weight/melamine 20 parts by weight p-tsa 2 parts by weight/silane-based additive 40 parts by weight | 3 Days | OK | 30% Dissolved |
| Comparative Example 4 | PVA 100 parts by weight/melamine 20 parts by weight silane-based additive 40 parts by weight | 1 Day or Less | OK | 100% Dissolved |
| Comparative Example 5 | PVA 100 parts by weight/melamine 20 parts by weight | 1 Day or Less | 10% Dissolved | 100% Dissolved |
| Comparative Example 6 | PVA 100 parts by weight | 5 Days or Longer | 100% Dissolved | 100% Dissolved |

In Comparative Example 1, it was seen that storage stability and water resistance after 100° C. curing decreased compared to when using parasulfonic acid, and in Comparative Example 2, it was seen that, polarizing plate water resistance was insufficient when there was no silane-based additive although storage stability was excellent.

In Comparative Example 3, it was seen that storage stability and water resistance were insufficient when using the acid catalyst outside a specific ratio, and in Comparative Examples 4 and 5, storage stability was very short of 1 day or less when the acid catalyst was not used, which makes it difficult to use in actual processes, and the curing temperature for securing water resistance was also 140° C. or higher, which causes difficulties to be used in actual processes.

The invention claimed is:
1. An adhesive composition comprising:
a polyvinyl alcohol-based resin;
a melamine-based crosslinking agent in 5 parts by weight to 100 parts by weight, with respect to 100 parts by weight of the polyvinyl alcohol-based resin;

an acid catalyst in 1 part by weight to 20 parts by weight, with respect to 100 parts by weight of the polyvinyl alcohol-based resin, wherein the acid catalyst includes a sulfonic acid group, and a weight ratio of the melamine-based crosslinking agent and the acid catalyst is from 5:1 to 1:1; and a silane-based additive in 10 parts by weight to 100 parts by weight, with respect to 100 parts by weight of the polyvinyl alcohol-based resin, wherein the melamine-based crosslinking agent is represented by the following Chemical Formula 1:

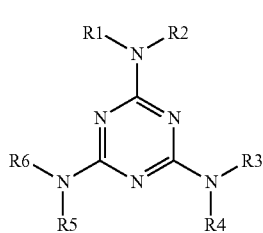

[Chemical Formula 1]

wherein, R1 to R6 are the same as or different from each other, and each is independently hydrogen, deuterium, a substituted or unsubstituted alkyl group, a substituted or unsubstituted alkoxy group, a substituted or unsubstituted imine group, a substituted or unsubstituted amine group, a substituted or unsubstituted heteroaryl group, or a substituted or unsubstituted aryl group.

2. The adhesive composition of claim 1, wherein R1 to R6 are an alkyl group substituted with an alkoxy group.

3. The adhesive composition of claim 1, wherein at least one of R1 to R6 is hydrogen.

4. The adhesive composition of claim 1, wherein the acid catalyst is paratoluenesulfonic acid.

5. The adhesive composition of claim 1, wherein the silane-based additive is a silane alkoxide-based compound.

6. The adhesive composition of claim 5, wherein the silane alkoxide-based compound includes an amine group or an epoxy group.

7. The adhesive composition of claim 1, which has a pH of 2 to 6.

8. The adhesive composition of claim 1, which has viscosity of 5 cp to 40 cp.

9. A protective film comprising:
an adhesive layer comprising the adhesive composition of claim 1, provided on one surface of the protective film.

10. The protective film of claim 9, which is a triacetylcellulose film, a cycloolefin polymer (COP) film or an acryl-based film.

11. A polarizing plate comprising:
a polarizer;
an adhesive layer provided on one surface of the polarizer and including the adhesive composition of claim 1; and
a protective film provided on at least one surface of the adhesive layer.

12. The polarizing plate of claim 11, wherein the adhesive layer has a thickness of greater than 0 μm and less than or equal to 20 μm.

13. An image display device comprising:
a display panel; and
the polarizing plate of claim 11 provided on one surface or both surfaces of the display panel.

* * * * *